United States Patent
Olden et al.

(10) Patent No.: US 8,242,422 B2
(45) Date of Patent: Aug. 14, 2012

(54) MODULAR DIVERT AND ATTITUDE CONTROL SYSTEM

(75) Inventors: Thomas A. Olden, Tucson, AZ (US);
Robert J. Cavalleri, Coral Springs, FL (US)

(73) Assignee: Raytheon Company, Waltham, MA (US)

( * ) Notice: Subject to any disclaimer, the term of this patent is extended or adjusted under 35 U.S.C. 154(b) by 751 days.

(21) Appl. No.: 12/484,986

(22) Filed: Jun. 15, 2009
(Under 37 CFR 1.47)

(65) Prior Publication Data
US 2011/0006152 A1  Jan. 13, 2011

Related U.S. Application Data

(63) Continuation-in-part of application No. 12/391,216, filed on Feb. 23, 2009.

(51) Int. Cl.
*F41G 7/00* (2006.01)
*F42B 15/01* (2006.01)
*F42B 15/00* (2006.01)

(52) U.S. Cl. ......... 244/3.1; 60/200.1; 60/204; 60/224; 60/225; 60/253; 102/283; 244/3.15; 244/3.21; 244/3.22

(58) Field of Classification Search ......... 244/3.1–3.19, 244/3.2–3.3; 102/283–292, 374, 376; 60/200.1, 60/204, 224, 225, 244, 245, 250, 251, 253–256; 149/2

See application file for complete search history.

(56) References Cited

U.S. PATENT DOCUMENTS

| | | | | |
|---|---|---|---|---|
| 3,023,570 A | * | 3/1962 | Crouch | 60/255 |
| 3,093,964 A | * | 6/1963 | Hausmann | 60/225 |
| 3,226,928 A | * | 1/1966 | Jackson et al. | 60/253 |
| 3,248,875 A | * | 5/1966 | Wolcott | 60/254 |
| 3,316,718 A | * | 5/1967 | Webb | 60/255 |
| 3,385,063 A | * | 5/1968 | Brown, Jr. | 60/225 |
| 3,393,517 A | * | 7/1968 | Altman et al. | 60/256 |
| 3,397,539 A | * | 8/1968 | Schubert | 60/255 |
| 3,442,084 A | * | 5/1969 | Cramm et al. | 60/256 |
| 3,527,168 A | * | 9/1970 | Friedlander et al. | 102/287 |
| 3,555,825 A | * | 1/1971 | Dilchert | 60/256 |
| 3,581,662 A | | 6/1971 | Grebert | |
| 3,584,461 A | | 6/1971 | Debize et al. | |
| 3,595,025 A | | 7/1971 | Stockel et al. | |

(Continued)

FOREIGN PATENT DOCUMENTS
WO  WO 2008-048702  4/2008

OTHER PUBLICATIONS

Snecma Propulsion Solide, Safran Group, Recent solid DACS achievements for high performance interceptors, 3rd AAAF International Conference on Missle Difense—7, Jun. 9, 2006, Seville.

(Continued)

*Primary Examiner* — Bernarr Gregory
(74) *Attorney, Agent, or Firm* — Eric A. Gifford

(57) ABSTRACT

There is disclosed a vehicle and methods for maneuvering the vehicle. The vehicle may include a plurality of multiple-impulse rocket motors, each of which comprises a plurality of independently ignitable solid fuel propellant charges, and a processor that generates at least one command to ignite at least one solid fuel propellant charge of at least one of the plurality of multiple-impulse rocket motors.

17 Claims, 10 Drawing Sheets

U.S. PATENT DOCUMENTS

| | | | |
|---|---|---|---|
| 3,698,183 A | 10/1972 | MacDonald et al. | |
| 3,992,877 A | 11/1976 | Granger | |
| 4,007,688 A | 2/1977 | Franz | |
| 4,345,427 A * | 8/1982 | Whitesides, Jr. | 60/254 |
| 4,357,795 A | 11/1982 | Bastian et al. | |
| 4,539,910 A | 9/1985 | Stevens | |
| 4,972,673 A | 11/1990 | Carrier et al. | |
| 5,024,160 A | 6/1991 | Canterberry et al. | |
| 5,062,593 A | 11/1991 | Goddard | |
| 5,440,993 A | 8/1995 | Osofsky | |
| 5,456,425 A | 10/1995 | Morris | |
| 5,608,183 A | 3/1997 | Barnes et al. | |
| 5,647,558 A * | 7/1997 | Linick | 244/3.11 |
| 5,675,966 A | 10/1997 | Dombrowski et al. | |
| 5,765,367 A | 6/1998 | Denoel | |
| 6,045,638 A | 4/2000 | Lundstrom | |
| 6,352,030 B1 | 3/2002 | Doll et al. | |
| 6,357,357 B1 | 3/2002 | Glasser | |
| 6,895,991 B2 | 5/2005 | Woessner | |
| 6,968,676 B1 | 11/2005 | Krishnan | |
| 7,000,377 B1 * | 2/2006 | Knight | 60/225 |
| 7,022,196 B2 * | 4/2006 | Cesaroni et al. | 149/2 |
| 7,194,852 B1 | 3/2007 | Krishnan | |
| 7,254,936 B1 * | 8/2007 | Knight | 60/250 |
| 7,281,367 B2 * | 10/2007 | Rohrbaugh et al. | 60/253 |
| 7,685,940 B1 * | 3/2010 | Cavalleri et al. | 102/376 |
| 7,886,519 B2 * | 2/2011 | Woessner et al. | 60/254 |
| 7,947,938 B2 * | 5/2011 | Dryer | 244/3.21 |
| 8,015,920 B1 * | 9/2011 | Wilkinson et al. | 244/3.21 |
| 2002/0157557 A1 | 10/2002 | Cesaroni et al. | |
| 2002/0195181 A1 | 12/2002 | Lundstrom et al. | |
| 2007/0044450 A1 | 3/2007 | Kuninaka | |
| 2008/0216462 A1 | 9/2008 | Woessner et al. | |

OTHER PUBLICATIONS

World Intellectual Property Organization, International Search Report and Written Opinion for International Application No. PCT/US2010/038547, mail date Aug. 23, 2010, pp. 1-8.

* cited by examiner

Section A-A

Section B-B

MODULAR DIVERT AND ATTITUDE CONTROL SYSTEM

RELATED APPLICATION INFORMATION

This patent is a continuation in part of the following prior-filed copending non-provisional patent applications: application Ser. No. 12/391,216, entitled "Pellet-Loaded Multiple Impulse Rocket Motor", filed Feb. 23, 2009, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a vehicle maneuvering system and method for intercepting and destroying ballistic missile re-entry vehicles and other targets.

2. Description of the Related Art

Systems for intercepting ballistic missile threats typically reply on a kinetic kill vehicle (KKV), also termed a "hit-to-kill" vehicle, to destroy the threat re-entry vehicle by way of physical collision. A missile carrying the KKV, or a plurality of KKVs, is launched to the place the KKV in a position proximate the trajectory of the target re-entry vehicle. The KKV then detects and tracks the target vehicle and navigates to attempt to physically collide with the target. Exemplary KKV development programs include the Exoatmospheric Kill Vehicle (EKV), the Lightweight Exoatmospheric Projectile (LEAP), and the Multiple Kill Vehicle (MKV).

KKVs are designed to intercept and destroy the target re-entry vehicle during the mid-course phase of the re-entry vehicle flight. The interception may occur above the earth's atmosphere at altitudes in excess of 100 miles. The combined speed of the KKV and the target re-entry vehicle may approach 15,000 miles per hour, or over 20,000 feet per second, such that a collision between the KKV and the re-entry vehicle will severely damage or destroy the re-entry vehicle. The KKV typically attempts to maneuver to assume a trajectory that is a reciprocal of the trajectory of the target re-entry vehicle, which is to say that the kill vehicle and target re-entry vehicles are traveling on the same or nearly the same trajectory in opposing directions. In reality, the kill vehicle will deviate from the desired reciprocal trajectory by an error amount, commonly termed the CEP or circular error probable. The CEP is defined as the radius of a circle about the desired trajectory that would contain the kill vehicle 50% of the time. A normal distribution of the vehicle navigation errors is commonly assumed, such that the kill vehicle will be within a circle having a radius of twice the CEP 93% of the time and within a circle having a radius of three times the CEP more than 99% of the time. Given the relatively small sizes of the hit-to-kill vehicle and the target re-entry vehicle and the extreme closing speed, the CEP of the KKV may need to be less than a fraction of a meter to provide a high probability of colliding with the target re-entry vehicle.

To meet these extremely precise navigational requirements, the KKV may include an on-board sensor and tracking system to track the target up to the point of collision. The KKV typically includes a divert and attitude control system (DACS) which is used to maneuver the KKV to the trajectory required to intercept the target. The DACS has a plurality of attitude thrusters that may be used to control the attitude or orientation of the KKV about three axes of rotation. The attitude thruster may be used, for example, to keep the target within the field of view of the on-board sensor. The DACS may also include a divert subsystem used to change the trajectory of the KKV in response to the target tracking system. A typical divert subsystem may include four nozzles disposed at 90-degree intervals about a perimeter of the KKV. Each nozzle may be used to exhaust gas in a direction generally normal to a longitudinal axis of the KKV which is typically aligned with the direction of travel. Gas may be exhausted selectively through the four nozzles to accelerate the KKV in a desired direction generally normal to the direction of travel to maneuver the KKV to intercept the target.

In typical divert subsystems, the gas exhausted through the nozzles of the divert subsystem may be provided by an independent liquid fuel rocket motor coupled to each nozzle or by a common gas supply such as a gas reservoir or a rocket motor. When independent rocket motors are used, the direction and magnitude of the thrust produced may be controlled by metering the fuel supplied to the rocket motors. When a common gas supply is used, the direction and magnitude of the thrust produced may be controlled by metering the gas supplied to the respective nozzles. When the common gas supply is a rocket motor, the combustion gases may be metered through so-called hot gas valves. The piping, valves, actuators and other components required to meter either liquid fuel or exhaust gas to multiple divert nozzles increases the cost and complexity of the KKV.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
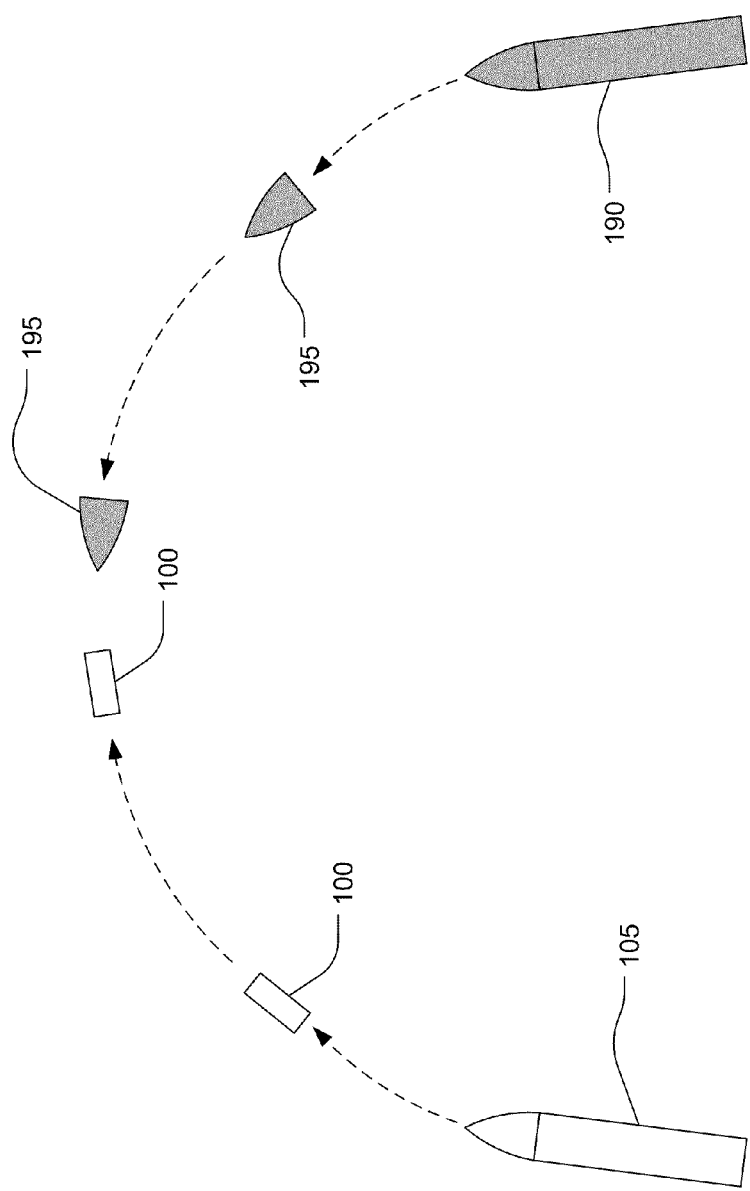
FIG. 1 is a schematic representation of an engagement between a large cross-section kill vehicle and a target re-entry vehicle.

Referring now to FIG. 1, an engagement between a KKV and a re-entry vehicle may begin when the launch of a ballistic missile 190 is detected. The launch may be detected by a ground-based early warning radar, a satellite-based infrared sensor, or some other sensor system. The ballistic missile 190 may be tracked by one or more sensor systems and an intended destination may be estimated. The ballistic missile 190 may include one or more rocket stages, which are not shown individually in FIG. 1. Some time after launch, the ballistic missile 190 may release a re-entry vehicle 195 containing a warhead. The ballistic missile may release other re-entry vehicles (not shown in FIG. 1) in addition to the re-entry vehicle 195, or may release a plurality of re-entry vehicles and decoy vehicles (not shown in FIG. 1).

At some time after the detection of the ballistic missile launch, an interceptor missile 105 may be launched to intercept the re-entry vehicle 195. The interceptor missile 105 may include one or more rocket stages, which are not shown individually in FIG. 1. Some time after launch, the interceptor missile may release a kill vehicle 100. The interceptor missile 105 may release other kill vehicles (not shown in FIG. 1) in addition to the kill vehicle 100. The other kill vehicles may be assigned to intercept other re-entry vehicles released by the ballistic missile 190. In some engagements, more than one kill vehicle may be assigned to intercept the re-entry vehicle 195.

The kill vehicle 100 may include a DACS used to maneuver the kill vehicle 100 onto a collision course with the re-entry vehicle 195 in an attempt to destroy the re-entry vehicle 195 by physical collision. In this patent, the term "collision course" is intended to mean a course where the CEP of the kill vehicle is centered on a trajectory that is generally reciprocal to the trajectory of the re-entry vehicle.

Figure 2:
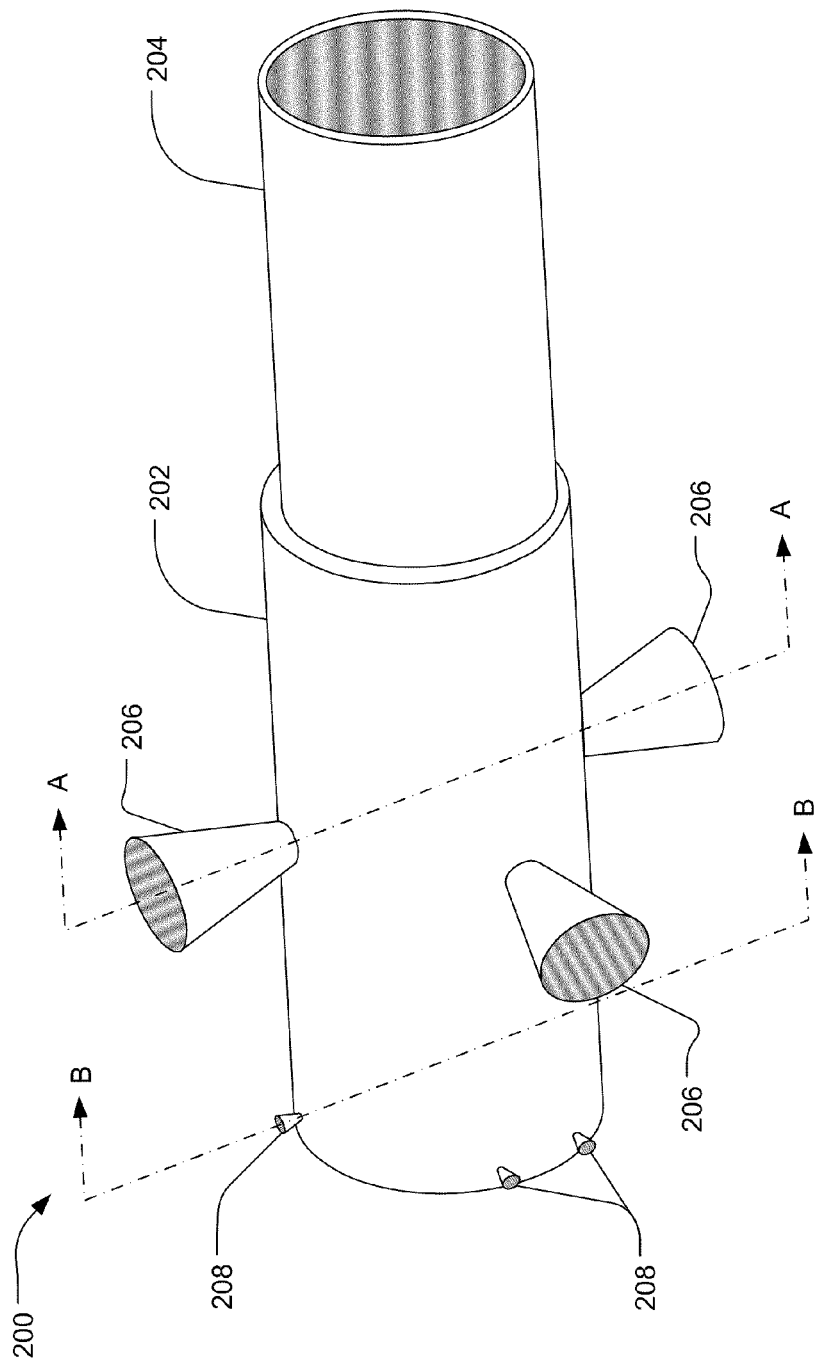
FIG. 2 is a perspective schematic view of an exemplary KKV.

Referring now to FIG. 2, an exemplary kill vehicle 200, which may be suitable for use as the kill vehicle 100, may include a vehicle body 202. The vehicle body 202 may contain or support a sensor, of which only a sun shade 204 is visible in FIG. 2, a DACS, and other communications, navigation, and control subsystems that are not shown in FIG. 2. The DACS may include a divert subsystem, of which only nozzles 206 are visible in FIG. 2, and an attitude control subsystem, of which only nozzles 208 are visible in FIG. 2. The vehicle body 202 is shown in FIG. 2 as a cylindrical housing which encloses the various subsystems of the kill vehicles 410. However, the vehicle body 202 may be an open chassis or frame. All or portions of the DACS, the sensor, and the communications, navigation, and control subsystems mounted external to the vehicle body 202.

The divert subsystem may include four nozzles 206, of which three are visible in part in FIG. 2. The divert nozzles 206 may be disposed to exhaust combustion gases to produce thrust along radial lines separated by 90-degree intervals. The divert nozzles may be disposed such that a plane passing through the center of each nozzles also pass through, or proximate to, a center of mass of the kill vehicle 410. The attitude control subsystem may include six or eight or more nozzles 208, of which only three are shown in FIG. 2.

Figure 3:
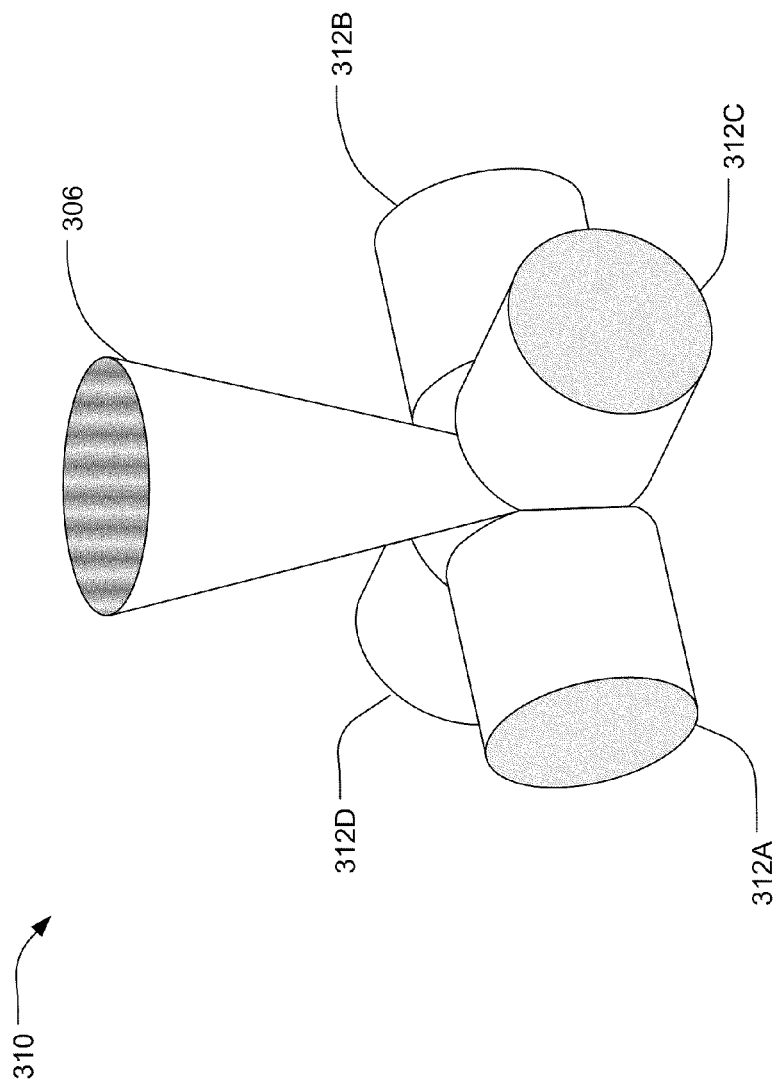
FIG. 3 is a perspective view of an exemplary multiple-impulse solid fuel rocket motor.

Referring now to FIG. 3, a multiple-impulse rocket motor 310 may be suitable for use in either the divert subsystem or the attitude control subsystem of a kill vehicle such as the kill vehicle 200. The multiple-impulse rocket motor 310 may include a plurality of independent combustion chambers 312A, 312B, 312C, 312D, which share a common nozzle 306. Each of the combustion chambers 312A-D may include a solid fuel propellant charge within a case coupled to the common nozzle 306. The solid fuel propellant charge within each of the combustion chambers 312A-D may be ignited independently and may burn without igniting or otherwise impacting the propellant charges within other combustion chambers. While the example of FIG. 3 shows four combustion chambers 312A-D, there may be two, three, six, eight, or some other number of combustion chambers sharing the common nozzle 306.

Each of the plurality of combustion chambers 312A-D may be separately and directly coupled to the common nozzle 306, such that a direct path is provided for combustion gases from each of the combustion chambers to the common nozzle 306 without flowing through any other of the combustion chambers. The plurality of combustion chambers 312A-D may be disposed radially about the common nozzle 306, as shown in FIG. 3, or may be disposed in some other manner. In this context, the term radially means to radiate outward but does not imply equal angular separation between adjacent combustion chambers. The plurality of combustion chambers 312A-D may be the same size, as shown in FIG. 3, or may be of different sizes.

Figure 4:
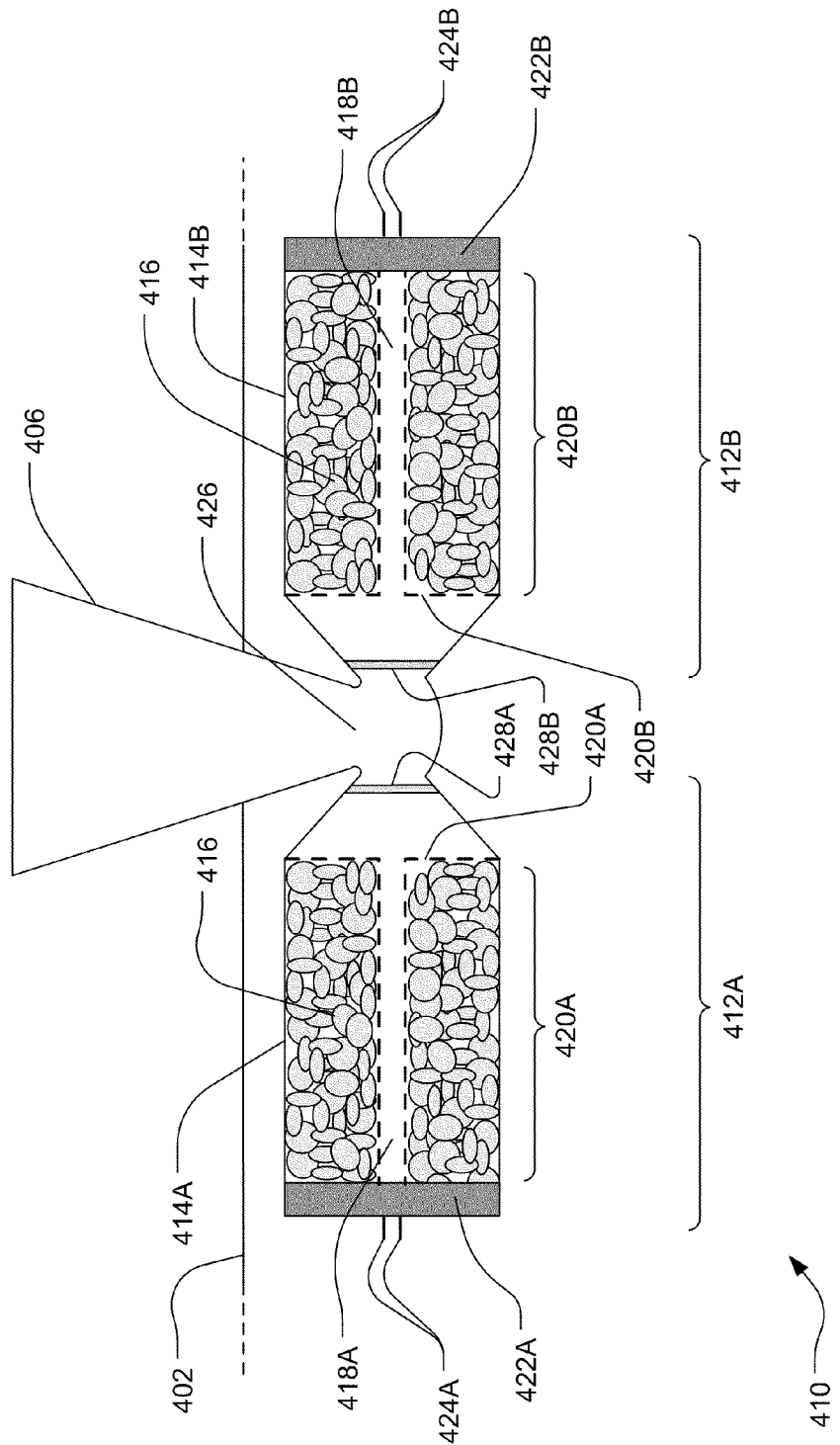
FIG. 4 is a schematic cross-sectional view of an exemplary pellet-loaded multiple-impulse solid fuel rocket motor.

FIG. 4 shows a cross-sectional view through two combustion chambers 412A, 412B of a pellet-loaded multiple-impulse rocket motor 410. The multiple-impulse rocket motor 410 may be suitable for use in either the divert subsystem or the attitude control subsystem of a kill vehicle such as the kill vehicle 410. The combustion chambers 412A, 412B may be the combustion chambers 312A, 312B of the multiple-impulse rocket motor 310 shown in FIG. 3. Each combustion chamber 412A, 412B may include a respective case 414A, 414B, a respective solid fuel propellant charge 420A, 420B, and a respective igniter 422A, 422B. The cases 414A, 414B may be coupled to a common nozzle 406.

In FIG. 4, the cases 414A, 414B and the nozzle 406 are represented by a continuous boundary. However, the cases 414A, 414B and the nozzle 406 may be three or more physically separable components that may be joined, for example, at mating threaded interfaces (not shown) or by welding or another attachment process.

When the pellet-loaded multiple-impulse rocket motor 410 is used as a divert motor or attitude control thruster for a missile having a generally cylindrical vehicle body, the combustion chambers 412A, 412B may be disposed generally parallel to an exterior wall of the vehicle body 402. The nozzle 406 may be adapted to discharge the exhaust gases from the pellet-loaded multiple-impulse rocket motor 410 through the side wall of the vehicle body 402. The nozzle 406 may be adapted to discharge the exhaust gases from the pellet-loaded multiple-impulse rocket motor 410 through the side wall of the vehicle body 402 in a direction approximately normal to the side wall.

The igniters 422A, 422B may be a small charge of flammable material that, when ignited, releases a predetermined amount of hot combustion gases. The combustion of the igniter may be initiated, for example, by an electric current applied through electrical contacts 424A, 424B. The electrical current may flow through a heater wire adjacent to, or embedded in, the flammable igniter material. In order to ignite one of the propellant charges 420A or 420B, it may be necessary for the temperature and pressure of the gases produced by the respective igniter 422A or 422B to both exceed predetermined values.

Prior to ignition of each igniter 422A, 422B and the respective propellant charges 420A, 420B, the coupling between each combustion chamber 412A, 412B and the nozzle 406 may be sealed by respective asymmetrical burst disks 428A, 428B. In this context, the term "burst disk" means any structure that isolates one of the combustion chambers 412A, 412B from the nozzle 406 until the propellant charge within the combustion chamber is ignited, at which time the pressure within the combustion chamber causes the disk to burst or otherwise open.

Upon ignition of one igniter, for example the igniter 422A, the respective burst disk may be effective to allow pressure to build within the combustion chamber 412A, and thus facilitate ignition of the propellant charge 420A. The burst disk 428A may be designed to rupture, blow free from the motor, or otherwise open a passage from the combustion chamber to the nozzle after the pressure within the combustion chamber 412A exceeds a predetermined pressure level, which may be, for example, between 100 and 4100 pounds per square inch (PSI). For example, the burst disk 428A may be retained in the nozzle by means of shear pins that fracture when the pressure exceeds the predetermined level. The burst disk 428A may have a controlled structural weakness that allows the burst disk to rupture in a controlled manner when the pressure exceeds the predetermined level.

The burst disks 428A, 428B may also serve to protect the solid fuel propellant charges 420A, 420B from environmental effects, such as humidity and precipitation.

Once the burst disk 428A ruptures, exhaust gases from combustion of the corresponding igniter 412A and propellant charge 420A may discharge through the nozzle 406. The nozzle 406 and the burst disks 428A, 428B may be adapted such that, when a single combustion chamber is ignited (for example combustion chamber 412A), the burst disks (such as burst disk 428B) within the other combustions chambers remain intact and prevent sympathetic ignition of the other combustion chambers. Each of the burst disks 428A, 428B may be asymmetrical in construction. For example, each of the burst disks 428A, 428B may be a frangible disk supported by a back-up member disposed on the side of the disk facing away from the nozzle, similar to the burst disks described in U.S. Pat. No. 4,505,180. The combination of the frangible disk and back-up member may allow the burst disk 428A, 428B to rupture at relatively low pressure when the propellant charge in the associated combustion chamber is ignited, but to not rupture when any other propellant charge is ignited. Thus each of the combustion chambers 412A, 412B of the pellet-loaded multiple-impulse rocket motor 410 may be independently ignitable.

To reduce the time required to ignite one of the propellant charges 420A, 420B, the interior of each combustion chamber 412A, 412B may be pressurized with air or another gas to an initial pressure level during manufacture. For example, the initial pressure in the cavity prior to ignition may be 500 to 4100 PSI. In this case, each burst disk 428A, 244B may be designed to retain the initial pressure level indefinitely and to rupture at a substantially higher pressure level after the respective propellant charge 420A, 420B is ignited.

Each propellant charge 420A, 420B may include a large plurality (dozens, hundreds, or thousands) of solid fuel pellets 416 which together constitute the solid propellant charge 420A, 420B. The solid fuel pellets 416 may be, for example, gas generator pellets that are produced in large quantities for use in automobile air bags.

Each solid fuel pellet 416 may be composed of at least some of an energetic fuel material and an oxidizer material. Each fuel pellet may contain additional binder and/or plasticizer material. The binder material and the plasticizer material may be reactive and may serve as a fuel material and/or an oxidizer material. Suitable compositions for gas generator solid fuel pellets are well known. Suitable gas generator compositions include, for example, compositions that are predominantly guanidine (or guanidinium) nitrate and basic copper nitrate, cobalt nitrate, and combinations thereof, as described in U.S. Pat. No. 5,608,183. At least 60% of the total mass of the fuel pellets may be composed of guanidine nitrate and basic copper nitrate. The solid fuel pellets may have relatively low combustion temperatures, for example between 1500° C. and 4100° C., such that components of the rocket motor 410 that are exposed to the combustion products may be fabricated from molybdenum or TZM (titanium-zirconium-molybdenum) alloy.

The solid fuel pellets 416 may be randomly disposed with the rocket motor as shown. Alternatively the solid fuel pellets 416 may be arranged or stacked in an ordered manner. To facilitate arranging or stacking fuel pellets in an orderly manner, each combustion chamber 412A, 412B may include rods, guides, or other structure (not shown in FIG. 2) to position the and retain the stacked pellets.

The solid fuel pellets 416 may all be identical or may be a mixture of two or more pellet compositions or sizes. Some or all of the solid fuel pellets may be coated with an inhibitor to change the burning characteristics of the fuel pellets. The inhibitor may be a non-burning or slowly burning organic, inorganic, or composite material that delays the ignition of the coated pellets and thus prolongs the burning time of the rocket motor. The inhibitor coating may be applied by painting, spraying, dipping or bonding. The thrust versus time profile of the rocket motor may be tailored by combining multiple fuel pellet sizes, compositions, and/or inhibitor coatings.

The solid fuel pellets 416 may be retained within the combustion chambers 412A, 412B by perforated pellet retainers 420A, 420B. The term "perforated" encompasses any type or shape of openings in the structure of the pellet retainer, and does not imply any particular method of forming or creating the openings. The pellet retainers 420A, 420B may, as shown in this example, extend along the length of the combustion chambers 412A, 412B. The pellet retainers 420A, 420B may define cavities 418A, 418B that may be devoid of fuel pellets. The cavities 418A, 418B may be generally cylindrical, as shown in FIG. 2, or some other shape. The cavities 418A, 418B may provide a direct passage for the hot combustion gasses from the burning fuel pellets to the nozzle 406. The cavities 418A, 418B may provide a direct passage for at least a portion of the hot combustion gasses from the igniters 422A, 422B to the fuel pellets 416.

The pellet retainers 420A, 420B may be a uniform diameter cylinder, a tapered cylinder or conical shape, or some other shape. The pellet retainer may have an irregular cross-section, particularly in situations where the combustion chamber cases 414A, 414B are not cylindrical. The pellet retainers 420A, 420B may be formed of a thin metal material with machined or chemically formed perforations. The pellet retainers 420A, 420B may be formed of a woven or etched screen or mesh. The retainers 420A, 420B may be formed as a single physical element, or may include a plurality of physical pieces such as, for example, a plurality of closely spaced metal disks, wires, or rods. However, the pellet retainers are formed, the perforations in the pellet retainers 420A, 420B may be circular, square, rectangular, or elongated slits, or any other shape that allows passage for the combustion gases while retaining the fuel pellets.

The dimensions of the perforations or openings in the pellet retainers 420A, 420B may be significantly smaller than at least one dimension of the fuel pellets 416, such that the fuel pellets may not pass through the pellet retainer until combustion is nearly complete. When combustion of the fuel pellets 416 is nearly complete, at least some of the fuel pellets may be swept through the perforations in the pellet retainers 420A, 420B into the respective cavity 418A, 418B by the flow of the combustion gases. The size of the perforations in the pellet retainers 420A, 420B, relative to the size of the pellets 416, may be such that at least a portion of the fuel pellets passing through the pellet retainer are completely burned before the fuel pellets pass through a throat 426, which may be the portion of the nozzle 406 having the smallest cross-sectional area. Fuel pellets that are completely burned within cavities 418A, 418B before passing through the throat 426 may fully contribute to the thrust of the rocket motor. Each fuel pellet that is still burning as it is ejected through the throat 426 may result in an incremental reduction in the total thrust provided by the rocket motor.

The combustion of the propellant charges 410A, 420B may be controlled, to some extent, by controlling the pressure within the combustion chambers 412A, 412B. The pressure within the combustion chambers may be determined, at least in part, by the cross sectional area of an aperture that restricts the flow of combustion gases from the propellant charges 420A, 420B to the outlet of the nozzle 406. The cross-sectional area of the throat 426 may be selected to control the pressure within each combustion chamber 412A, 412B during combustion. In this case, the total cross-sectional area of the perforations in each of the pellet retainers 420A, 420B may be larger than the cross-section area of the throat 426.

The perforations in the pellet retainers 420A, 420B may be used to control, at least in part, the pressure at the propellant charges 420A, 420B by restricting the flow of combustion gases from the burning fuel pellets 416 to the nozzle 406. The size and distribution of the perforations in the pellet retainers 420A, 420B may be used to control the flow of combustion gases and the pressure gradients within each combustion chamber 412A, 412B. In this case, the total cross-sectional area of the perforations in each of the pellet retainers 420A, 420B may be comparable to or smaller than the cross-section area of the throat 426.

The cases 414A, 414B, the nozzle 406, and the pellet retainers 420A, 420B may be fabricated of a ceramic material, a metal material such as molybdenum or TZM alloy, or another material. The cases 414A, 414B, the nozzle 406, and the pellet retainers 420A, 420B may be fabricated primarily of a material, such as a steel or reinforced composite material, that cannot directly withstand the combustion temperatures of the fuel pellets if suitable thermal insulating layers are provided. The cases 414A, 414B, the nozzle 406, and the pellet retainers 420A, 420B may be fabricated primarily of a material, such as a steel or reinforced composite material, that cannot directly withstand the combustion temperatures of the fuel pellets if the various elements are thick enough to retain physical integrity for the duration of the rocket motor burn in spite of erosion or other degrading effects of the combustion gases.

Figure 5:
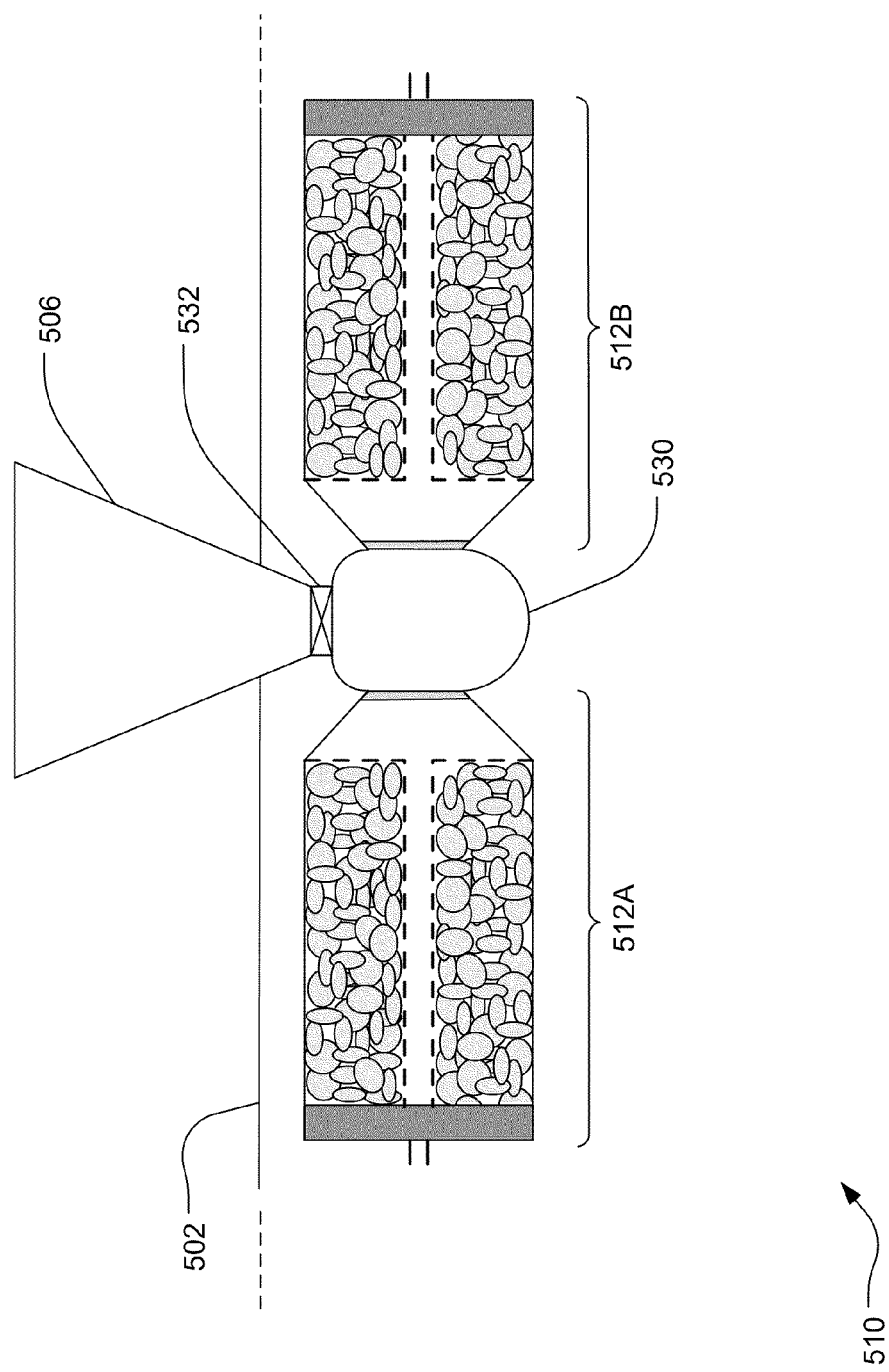
FIG. 5 is a schematic cross-sectional view of an exemplary pellet-loaded multiple-impulse solid fuel rocket motor.

FIG. 5 shows a cross-sectional view through two combustion chambers 512A, 512B of a pellet-loaded multiple-impulse rocket motor 510. The multiple-impulse rocket motor 510 may be generally similar to the multiple-impulse rocket motor 410 and the description of equivalent elements will not be repeated. The two combustion chambers 512A, 512B may be indirectly coupled to a common nozzle 506 through a gas reservoir 530 and a valve 532. The gas reservoir 530, in combination with any empty combustion chambers, may accumulate gas produced by the combustion of fuel within one or both of the combustion chambers 512A, 512B. The accumulated gas may be exhausted through the valve 532 in increments smaller than the amount of gas produced by the ignition of a single combustion chamber. The gas accumulated in the gas reservoir 530 may be replenished by the ignition of a combustion chamber 512A, 512B on an as-needed basis.

Figure 6:
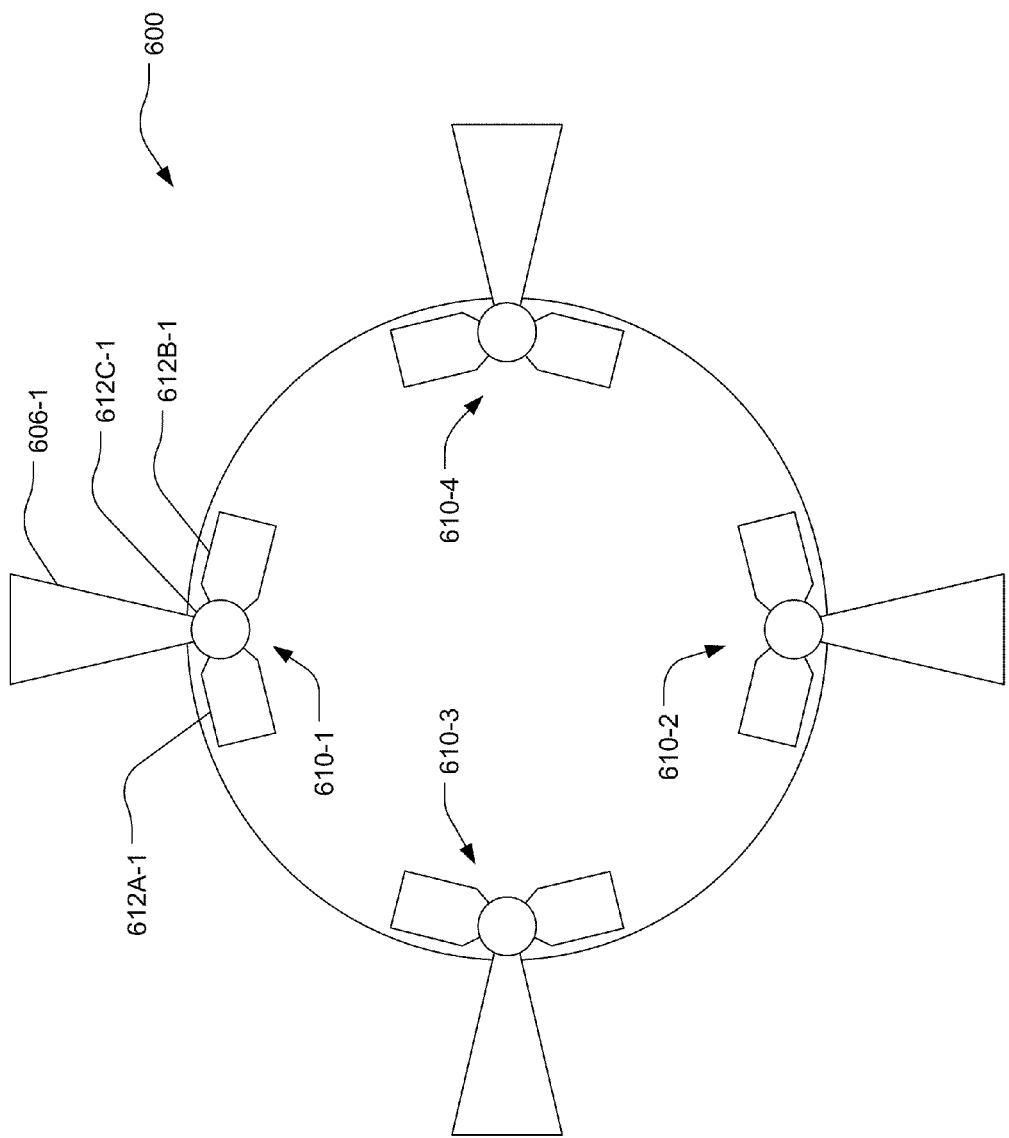
FIG. 6 is a schematic cross-sectional view of the exemplary KKV of FIG. 1.

FIG. 6 shows a cross-sectional view of an exemplary kill vehicle 600 which may be the kill vehicle 200. FIG. 6 is a cross-sectional view through a plane A-A identified in FIG. 2. The kill vehicle 600 may include four multiple-impulse rocket motors 610-1, 610-2, 610-3, and 610-4, which collectively form a divert subsystem. Each of the multiple-impulse rocket motors 610-1, 610-2, 610-3, 610-4 may include a single nozzle, such as the nozzle 606-1, coupled to a plurality of combustion chambers, such as the combustion chambers 612A-1, 612B-1, 612C-1, each of which contains an independently-ignitable solid-fuel propellant charge. Each of the multiple-impulse rocket motors 610-1, 610-2, 610-3, 610-4 may be a multiple-impulse rocket motor 310 as shown in FIG. 3. Although FIG. 6 is a cross-sectional view, interior details of the four multiple-impulse rocket motors 610-1, 610-2, 610-3, and 610-4 are not shown but may be similar to the pellet-loaded multiple-impulse rocket motor 410 or 510.

The four multiple-impulse rocket motors 610-1, 610-2, 610-3, and 610-4 may be disposed at 90-degree intervals about a circumference of the kill vehicle 600. The four multiple-impulse rocket motors 610-1, 610-2, 610-3, and 610-4 may be oriented such that the thrust produced by each motor is directed essentially normal to a longitudinal axis of the kill vehicle 600. The thrust produced by each motor may be directed essentially along a radial line in the plane A-A (the plane of the drawing in FIG. 6). The plane A-A may pass through or close to a center of mass of the kill vehicle 600 such that the thrust from one or more of the four multiple-impulse rocket motors 610-1, 610-2, 610-3, and 610-4 may cause acceleration of the kill vehicle in a direction normal to the longitudinal axis without introducing substantial rotation of the kill vehicle.

Figure 7:
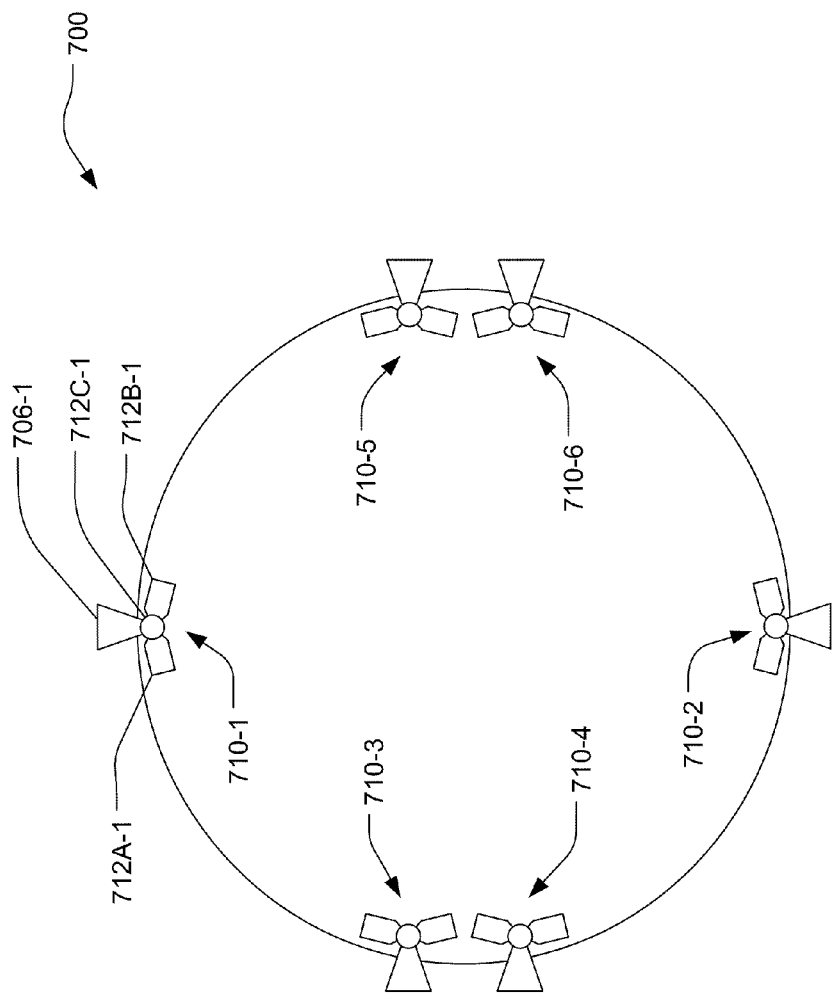
FIG. 7 is another schematic cross-sectional view of the exemplary KKV of FIG. 1.

FIG. 7 shows a cross-sectional view of an exemplary kill vehicle 700 which may be the kill vehicle 200. FIG. 7 is a cross-sectional view through a plane B-B identified in FIG. 2. The kill vehicle 700 may include six or more attitude thrusters 710-1, 710-2, 710-3, 710-4, 710-5, and 710-6, which collectively form an attitude control subsystem. Each of the attitude thrusters 710-1, 710-2, 710-3, 710-4, 710-5, 710-6 may include a single nozzle, such as the nozzle 706-1, coupled to a plurality of combustion chambers, such as the combustion chambers 712A-1, 712B-1, 712C-1. Each combustion chamber may contain an independently ignitable solid fuel charge. Each of the attitude thrusters 710-1, 710-2, 710-3, 710-4, 710-5, 710-6 may be a multiple-impulse rocket motor 310 as shown in FIG. 3. Although FIG. 7 is a cross-sectional view, interior details of the attitude thrusters 710-1, 710-2, 710-3, 710-4, 710-5, 710-6 are not shown but may be similar to the pellet-loaded multiple-impulse rocket motor 410 or 510.

The attitude thrusters 710-1, 710-2, 710-3, 710-4, 710-5, 710-6 may be disposed about a circumference of the kill vehicle 700. The attitude thrusters 710-1, 710-2, 710-3, 710-4, 710-5, 710-6 may be oriented such that the thrust produced by each motor is directed outward from a longitudinal axis of the kill vehicle 700 but not necessarily along a radial line. At least some of the attitude thruster may be oriented to emit thrust in non-radial directions to cause rotation of the kill vehicle about the longitudinal axis. The plane B-B (the plane of the drawing in FIG. 7) may be distant from the center of mass of the kill vehicle 700 such that the thrust from one or more of the attitude thrusters 710-1, 710-2, 710-3, 710-4, 710-5, 710-6 may cause rotational acceleration of the kill vehicle without introducing substantial movement of the kill vehicle transverse to the longitudinal axis.

FIG. 8A and FIG. 8B show top and side views, respectively, of an exemplary pellet-loaded multiple-impulse rocket motor 810 that includes a plurality of independent combustion chambers 812A, 812B, 812C, 812D which share a common nozzle 806. The pellet-loaded multiple-impulse rocket motor 810 may be suitable for use as a motor 610-1 to 610-4 in a divert subsystem or an attitude thruster 710-1 to 710-6. Each of the combustion chambers 812A-D may include a propellant charge within a case coupled to the common nozzle 806. Each of the propellant charges may be ignited independently and may burn without igniting or otherwise impacting the propellant charges in other combustion chambers.

Figure 8:
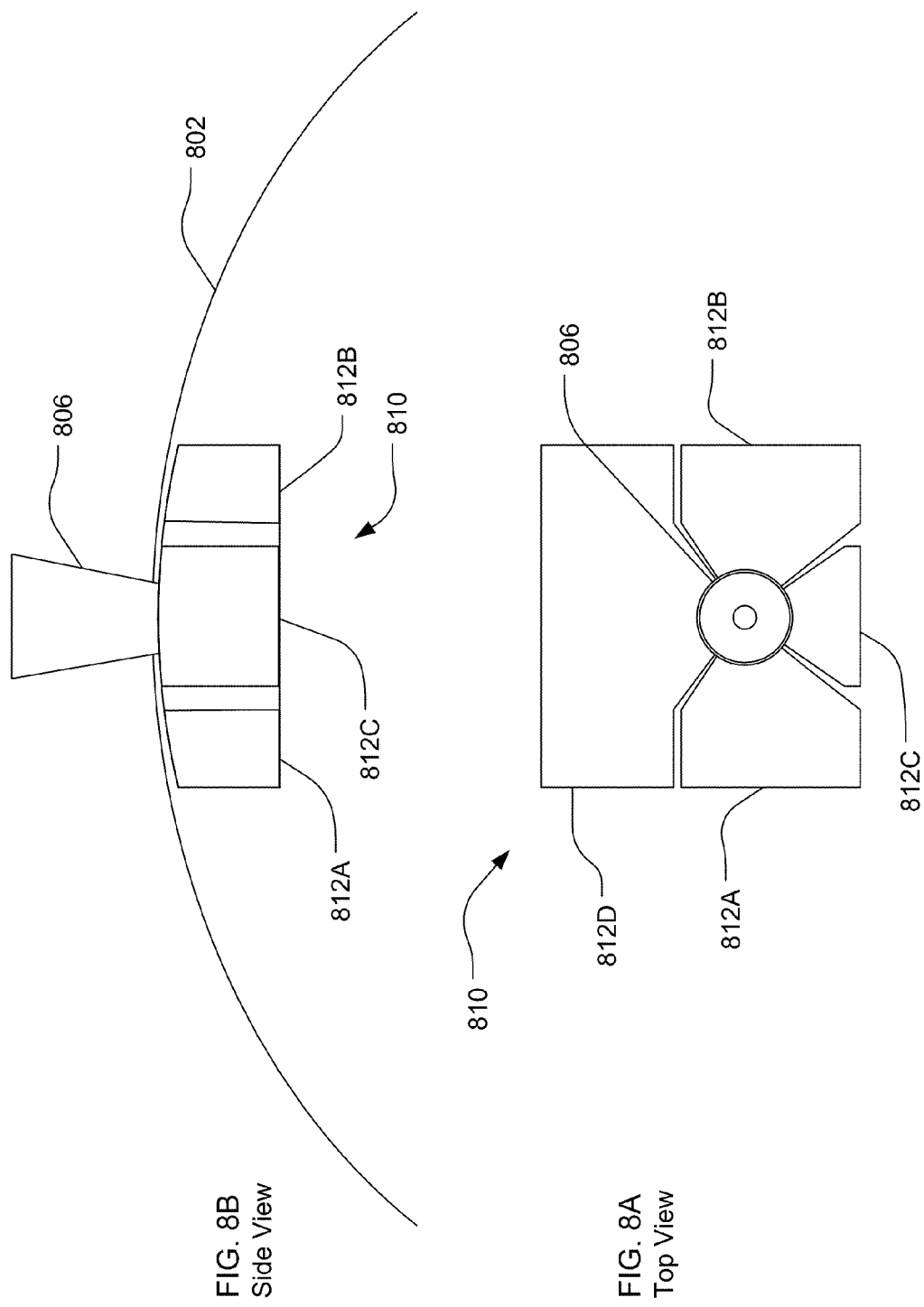
FIG. 8A is a schematic top view of an exemplary multiple-impulse solid fuel rocket motor.
FIG. 8B is a schematic cross-sectional view of the exemplary multiple-impulse solid fuel rocket motor of FIG. 7A.

The plurality of independent combustion chambers 812A-D may be of several different sizes and may provide corresponding different impulse values. In contrast to the rocket motors 310, 410, 510, 610, and 710 shown in previous figures, the plurality of independent combustion chambers 812A-D are not generally cylindrical in shape. Since the propellant charge within each of the plurality of independent combustion chambers 812A-D may be a plurality of solid fuel pellets, the shape and form factor of the combustion chambers 812A-D may be arbitrary. The shape and form factor of the combustion chambers 812A-D may be designed to minimize the overall volume occupied by the multiple-impulse rocket motor 810. The shape and form factor of the combustion chambers 812A-D may be designed to occupy an irregularly-shaped available volume within or on a kill vehicle. In particular, as shown in FIG. 8, at least a portion of the case of some or all of the combustion chambers 812A-D may be adapted to be conformal to a surface 802 which may be a vehicle body.

Figure 9:
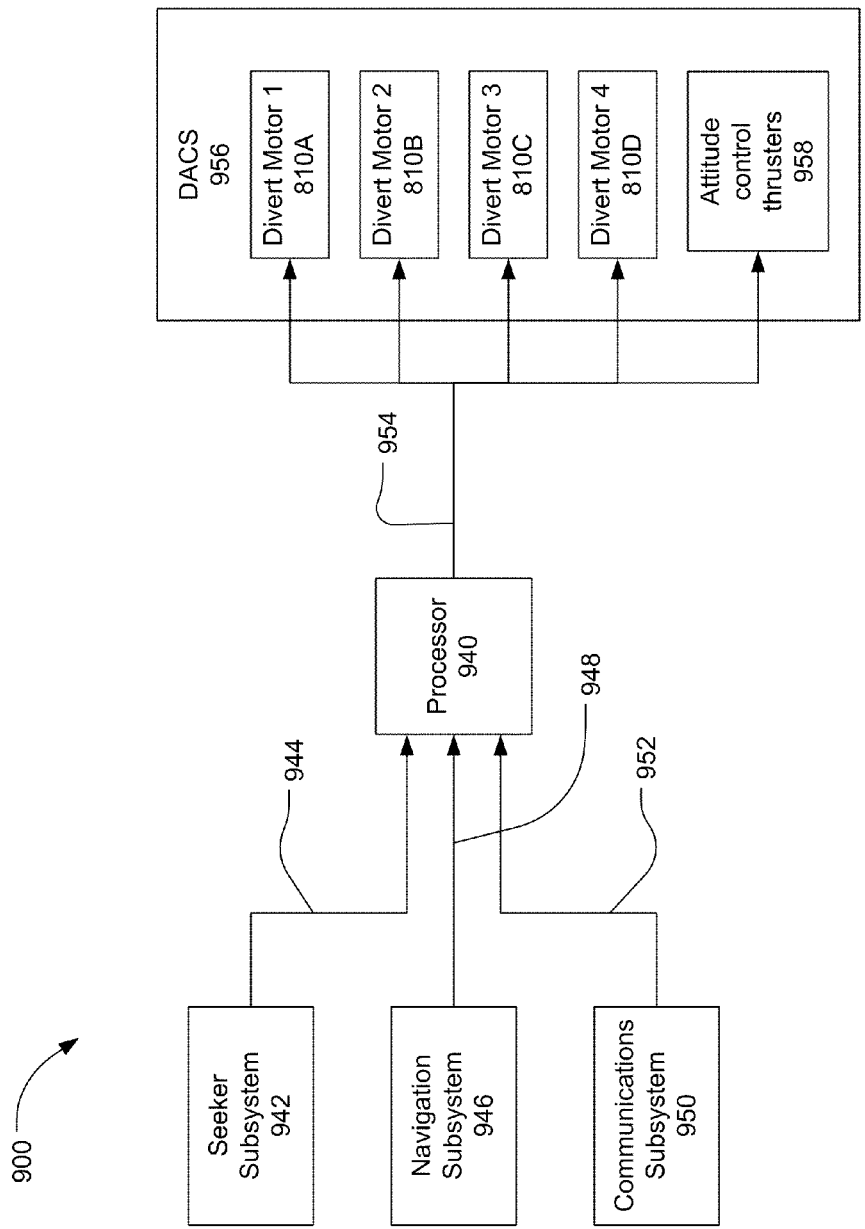
FIG. 9 is a block diagram of a KKV.

Referring now to FIG. 9, a kill vehicle 900, which may be the kill vehicle 100, may include a processor 940, a DACS 956, and at least one of a seeker subsystem 942, a navigation subsystem 946, and a communications subsystem 950. The DACS 956 may include a divert subsystem with four divert motors 910A, 910B, 910C, 910D. The divert motors may be multiple-impulse rockets motors such as the multiple impulse rocket motors 310, 410, 510, and 610. The DACS 956 may include an attitude control subsystem 958 which may also include a plurality of attitude thrusters which may also be multiple impulse rocket motors such as the motors 310, 410, 510 and 610. The divert motors 910A, 910B, 910C, 910D, the attitude thrusters, or both the divert motors and attitude thrusters may be pellet-loaded multiple-impulse rocket motors such as the motors 310, 410, 510 and 610.

The seeker subsystem 942, if present, may contain one or more seekers such as, for example, an imaging infrared (IIR) seeker, a laser radar seeker, and/or a radar seeker. The seeker subsystem 942 may provide one or more guidance signals 944 to the processor 940. The guidance signals 944 provided by the seeker subsystem 942 may indicate the direction to a target being tracked by the seeker subsystem.

The navigation subsystem 946, if present, may contain one or more navigation systems such as, for example, an inertial navigation system. The navigation subsystem 946 may provide one or more state signals 948 to the processor 940. The state signals 948 provided by the navigation subsystem 946 may define a specific current state of the kill vehicle 900. For example, the state signals 948 may define a current velocity vector of the kill vehicle 900 and the orientation and acceleration of the kill vehicle 900 with respect to the velocity vector.

The communications subsystem 950, if present, may contain a data link or other communication device to receive command and control information from a source external to the missile. The received command and control information may include one or more commands 952 which may be provided to the processor 940. The commands 952 provided by the communications subsystem 950 may, for example, designate a specific target to be tracked and engaged by the kill vehicle 900.

The processor may generate control signals 954 based on one or more of the guidance signals 954, the state signals 948, and the commands 952. For example, the processor 940 may generate control signals 954 based on the state signals 948 and commands 952 to cause the attitude control thrusters 959 to orient the kill vehicle 900 such that the seeker subsystem 942 may track a designated target. Subsequently, the processor 940 may generate additional control signals 954 based on the state signals 948 and guidance signals 944 to cause the DACS 956 to maneuver the kill vehicle 900 to intercept the designated target.

The control signals 954 generated by the processor 940 may include signals to ignite one or more selected propellant charges within one or more of the divert motors 810A-D and/or the attitude thrusters 848. When the divert motors 810A-D and/or attitude thrusters 848 that include gas reservoirs and valves (530, 532 in FIG. 5), the control signals 954 may include signals to open or close one or more of the valves.

Description of Processes

Figure 10:
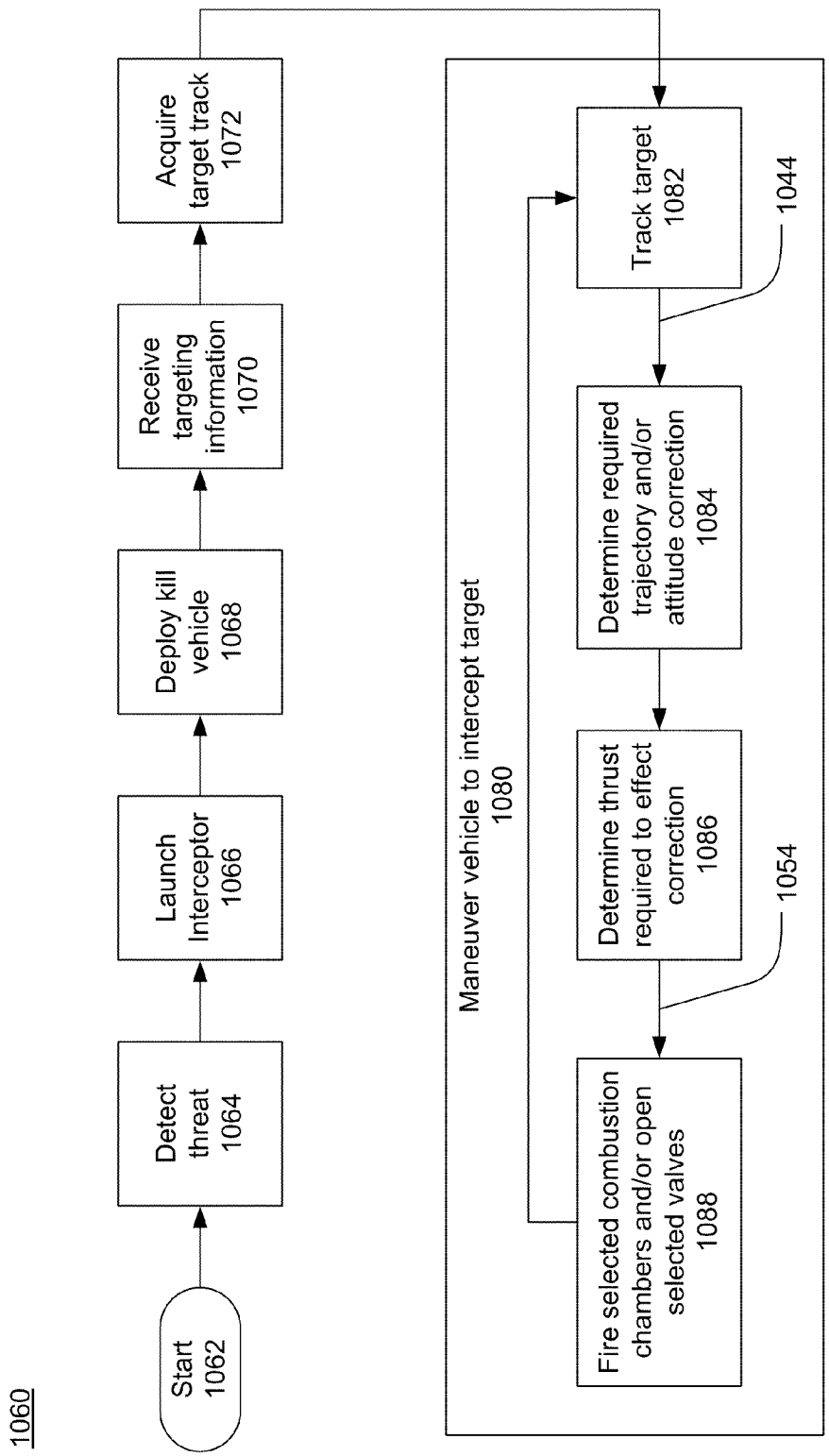
FIG. 10 is a flow chart of a process for intercepting a target.

Referring now to FIG. 10, a flow chart of a process 1060 for engaging a ballistic missile target with a kill vehicle starts at 1062 and continues at 1080 until the kill vehicle either collides with, or nearly collides with, the target. At the start of the process at 1062, systems for detecting target threats and for launching interceptors are deployed and the kill vehicle is mounted on an interceptor missile. At the conclusion of the process at 1080, the target has been intercepted and, if the engagement is successful, destroyed.

At 1064, the launch of a ballistic missile target may be detected. The launch may be detected by a ground-based early warning radar, a satellite-based infrared sensor, or some other sensor system. The threat may be tracked by one or more sensor systems and an intended destination may be estimated. Some time after launch, the threat may release a target re-entry vehicle which may contain a nuclear, biological, chemical, or conventional warhead. The threat may release a plurality re-entry vehicles or a plurality of re-entry vehicles and decoy vehicles. The process 1060 is directed to intercepting and destroying a specific target re-entry vehicle.

At some time after the detection of the threat launch at 1064, the interceptor missile may be launched at 1066 to intercept the target re-entry vehicle. At 1068, at a predetermined time after launch, the interceptor missile may deploy at least one kill vehicle, such as the kill vehicle 200 or 900, assigned to intercept the target re-entry vehicle.

At 1070, the kill vehicle may receive, via a communications subsystem such as the communication subsystem 950, command and control instructions including information designating a specific target to be engaged. The information designating the specific target may, for example, include information indicating a relative position of the designated target such that the kill vehicle may orient itself at 1072 to acquire and track the target using an on-board seeker subsystem such as the seeker subsystem 942.

At 1080, the kill vehicle may maneuver to a reciprocal of the trajectory of the target re-entry vehicle such that the kill vehicle will intercept and, if successful, collide with the target re-entry vehicle. The action at 1080 may be a continuous closed-loop process rather than a single event. The target may be tracked at 1082 by a seeker subsystem that generates guidance signals 1044. For example, the guidance signals 1044 may indicate a present position and velocity of the target with respect to the kill vehicle. At 1084, an error between the present trajectory of the kill vehicle and a trajectory required to intercept the target may be calculated, and a required correction to the trajectory and/or attitude of the kill vehicle may be determined.

At 1086, the thrust necessary to effect the required correction may be determined, for example by applying of control laws for the specific kill vehicle to the required trajectory and/or attitude correction from 1084. Controls signals 1054 may be generated based on the thrust necessary to effect the required correction. Control signals 1054 may include at least one signal that causes ignition of one or more combustion chamber within the kill vehicle's DACS. When the DACS includes multiple-impulse rocket motors including gas reservoirs, such as the multiple-impulse rocket motor 510, the control signals may include or be one or more signal to open and/or close one or more gas valves within the DACS.

At 1088, one or more combustion chambers within the DACS may be ignited and/or or more valves within the DACS may be opened or closed to provide the thrust as determined at 1086. Although the actions from 1082 to 1088 are shown as sequential for ease of explanation, these actions may be performed essentially simultaneously as a real-time control loop. The actions from 1082 to 1088 may be performed continuously from the time a track of the designated target is acquired at 1072 until the kill vehicle intercepts the target.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A vehicle, comprising:
   a plurality of multiple-impulse rocket motors, each of which comprises a plurality of independently ignitable solid fuel propellant charges; and
   a processor that generates at least one command to ignite at least one solid fuel propellant charge of at least one of the plurality of multiple-impulse rocket motors.

2. The vehicle of claim 1, wherein each multiple-impulse rocket motor further comprises:
   a nozzle, and
   a plurality of combustion chambers coupled to the nozzle, wherein
   each of the plurality of combustion chambers at least partially encloses a respective solid fuel propellant charge, and
   a gas path from each solid fuel propellant charge to the nozzle is obstructed, prior to ignition of the solid fuel propellant charge, by an asymmetrical burst disk.

3. The vehicle of claim 2, wherein at least some of the multiple-impulse rocket motors further comprise:
   a gas reservoir coupled to accumulate combustion gases produced by combustion of one or more of the propellant charges; and
   a valve to control the flow of gases from the gas reservoir to the nozzle,
   wherein the processor provides commands to open and close the valve, and
   wherein each burst disc is disposed between the respective solid fuel propellant charge and the gas reservoir.

4. The vehicle of claim 3, wherein at least some of the plurality of multiple-impulse rocket motors are pellet-loaded multiple-impulse rocket motors.

5. The vehicle of claim 1, wherein the plurality of multiple-impulse rocket motors includes a plurality of divert motors.

6. The vehicle of claim 5, wherein the plurality of divert motors consists of four divert motors, which are
   disposed in a plane that is normal to a longitudinal axis of the vehicle and proximate to a center of mass of the vehicle, and
   oriented to generate thrust in radial directions separated by 90-degree intervals.

7. The vehicle of claim 1, wherein the plurality of multiple-impulse rocket motors includes a plurality of attitude thrusters.

8. The vehicle of claim 7, wherein the plurality of attitude thrusters are
   disposed in positions remote from a plane that is normal to a longitudinal axis of the vehicle and proximate to a center of mass of the vehicle, and
   oriented to generate thrust outward from the longitudinal axis in respective directions including radial directions and non-radial directions.

9. The vehicle of claim 1 wherein the processor generates the at least one command based on signals received from one or more of a seeker subsystem, a communications subsystem, and a navigation subsystem.

10. The vehicle of claim 9, wherein
    the seeker subsystem tracks a target,
    the processor generates commands to maneuver the vehicle onto a trajectory to intercept the target based on guidance signals from the seeker subsystem.

11. A method of controlling the trajectory of a vehicle, comprising:
    determining a thrust required to effect a change from a present trajectory to a desired trajectory;

selecting one or more solid fuel propellant charges collectively adapted to produce the required thrust; and igniting the one or more selected solid fuel propellant charges, wherein each selected solid fuel propellant charge is one of a plurality of solid fuel propellant charges within one of a plurality of multiple-impulse rocket motors.

12. The method of claim 11, wherein at least some of the plurality of multiple-impulse rocket motors include gas storage reservoirs, igniting the one or more selected solid fuel propellant charge causes one or more gas reservoirs to accumulate combustion gases, and the method further comprises opening respective values coupled to the one or more gas reservoirs to exhaust combustion gases to produce the required thrust.

13. The method of claim 12, further comprising:

tracking a target, wherein the desired trajectory causes the vehicle to intercept the target.

14. The method of claim 12, wherein the method is performed continuously and in real time.

15. A method of maneuvering a vehicle having a plurality of multiple-impulse rocket motors disposed to control a trajectory and an attitude of the vehicle, each multiple-impulse rocket motor including a plurality of independently-ignitable solid fuel charges, the method comprising:

determining a thrust required to effect a required change in at least one of the trajectory of the vehicle and the attitude of the vehicle;

selecting one or more solid fuel propellant charges collectively adapted to produce the required thrust; and igniting the one or more selected solid fuel propellant charges.

16. The method of claim 15, wherein igniting the one or more selected solid fuel propellant charge causes one or more gas reservoirs to accumulate combustion gases, the method further comprising:

opening one or more values coupled to respective gas reservoirs to exhaust combustion gases to produce the required thrust;

each selected solid fuel propellant charge is one of a plurality of solid fuel propellant charges within one of a plurality of multiple-impulse rocket motors.

17. The method of claim 15, further comprising:

tracking a target determining the change in the trajectory of the vehicle required to maneuver the vehicle to intercept the target.

* * * * *